June 20, 1967 F. D. KOTTLER 3,327,106
MULTILAMP PHOTOFLASH PACKAGE
Original Filed Dec. 14, 1964
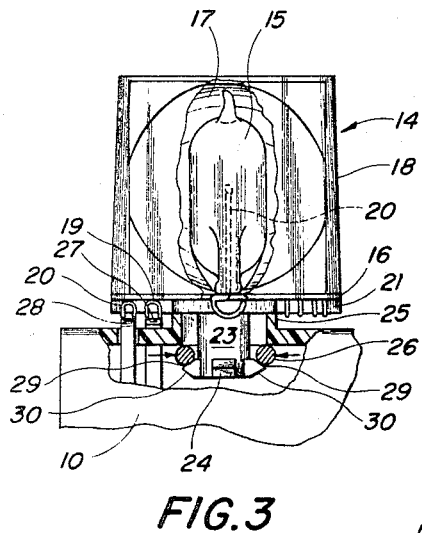
FIG.3
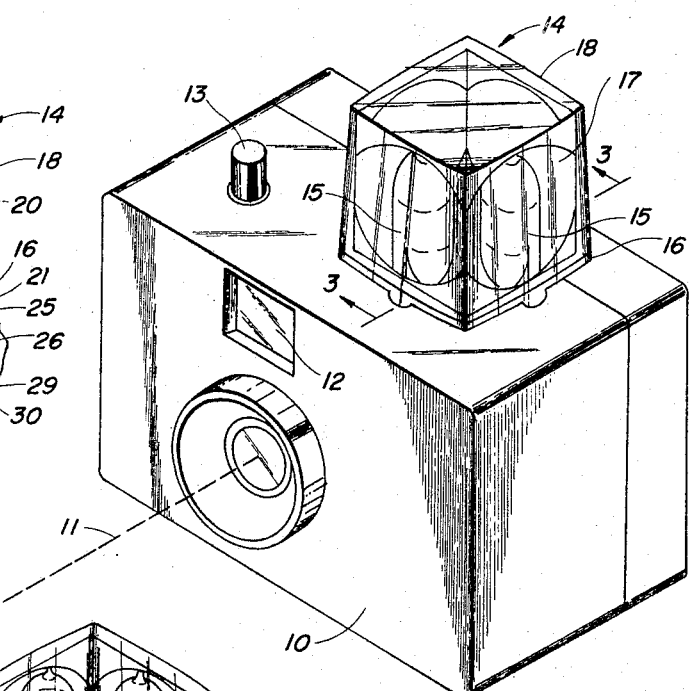
FIG.1
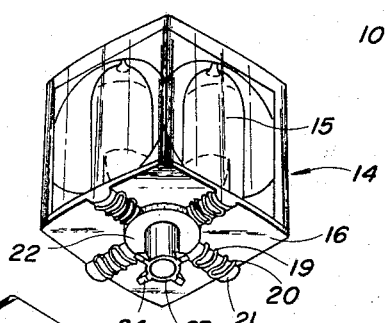
FIG.2
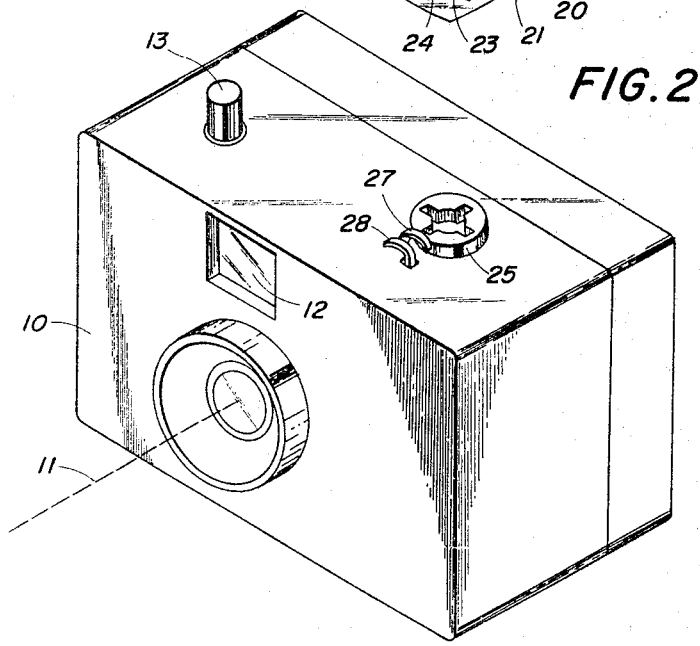
INVENTOR
FRANKLIN D. KOTTLER
BY
ATTORNEYS

United States Patent Office 3,327,106
Patented June 20, 1967

3,327,106
MULTILAMP PHOTOFLASH PACKAGE
Franklin D. Kottler, Rochester, N.Y., assignor, by mesne assignments, to Sylvania Electric Products Inc., Salem, Mass., a corporation of Delaware
Original application Dec. 14, 1964, Ser. No. 417,915. Divided and this application Apr. 15, 1965, Ser. No. 448,453
1 Claim. (Cl. 240—1.3)

ABSTRACT OF THE DISCLOSURE

A unitary, disposable, multiflash lamp unit in which a center connecting post depending from the base thereof is provided with a plurality of radially extending lugs for cooperative engagement with a camera socket.

---

This application is a division of my copending application Ser. No. 417,915, filed Dec. 14, 1964. The present invention relates to flash photography, and more particularly, to disposable multilamp photoflash packages for use with photographic still cameras.

With the development of miniaturized photoflash lamps such as the all glass (A.G.) lamps, there is contemplated a disposable package containing a plurality of such lamps and designed for simple handling and more rapid lamp replacement after each flash exposure. In this respect, the present invention provides new and useful connecting means including a connecting base for such disposable multilamp packages for insertion into a suitable receiving socket forming a part of a photographic camera or flash attachment whenever flash exposures are desired.

An important object of the present invention resides, therefore, in the provision of a means for connecting a disposable multilamp photoflash package or unit with a photographic camera or flash attachment to enable the taking of a series of pictures with supplementing photoflash.

Another object is to provide a connecting base for such a disposable multilamp photoflash unit which is readily connectable with a photoflash circuit receiving socket.

These and other objects and advantages will become more apparent in the course of the following description, in which the accompanying drawing forms a part thereof and wherein:

FIG. 1 is a perspective view of a preferred embodiment of a disposable multilamp photoflash package according to the present invention, as inserted in the receiving socket of a photographic camera;

FIG. 2 is a perspective view of the photoflash package with the package being removed from the camera receiving sockets; and FIG. 3 is a partial section view taken on line 3—3 of FIG. 1.

With reference to FIGS. 1 and 2, the present invention relates to a disposable multilamp package comprising a plurality of photoflash lamps for selective inclusion in a photographic flash circuit by rotation of the package about a vertical axis.

Typically, a photographic camera which may be used with a multilamp package according to the present invention includes a housing 10 and an objective or picture-taking axis 11 on which the camera elements such as a lens, diaphragm aperture and a frame of light sensitive photographic film normally are disposed. There may also be a typical viewfinder 12 and a body release member 13 used to initiate the picture-taking operation. However, the present description will be limited to those elements forming a part of or cooperating directly with the present invention, the elements which are not shown here being understood to be selected from those known in the photographic art.

Detachably connectable with the camera for use in flash photography is a disposable multilamp photoflash package or unit 14 which comprises a plurality (four) of photoflash lamps 15 of known manufacture, such as an A.G. (all glass) variety, orthogonally disposed in a vertical position on respective sides of a substantially square horizontal base 16 about a central vertical axis thereof. Behind each photoflash lamp 15 is an individual dished reflector 17 sufficient to provide the proper light emission pattern without the need for additional reflector surfaces. A transparent or light transmitting protective cover 18 of cubic shape having a top and four side walls is permanently sealed to the upper surface of the base 16 and overlies the lamps 15 and the reflections 17. The cover 18 functions as a flash guard, while it further permits easy handling of the multilamp unit by eliminating the need for handling miniature or hot lamps, etc.

Each photoflash lamp 15 includes a pair of lead-in wires 19, 20 extending to the interior of the hermetically sealed glass envelope of the respective lamp 15 in a known manner in order to ignite a charge of combustible material therein whenever an electrical potential is applied to the lead-in wires. The ends of the lead-in wires 19, 20 pass downwardly through suitable openings in the base 16 and are bent at their respective ends to form U-shaped stirrups in a manner like that of existing A.G. type photoflash lamps, the U-ends of the stirrups all facing in a clockwise direction when looking at the base 16 from below.

Underlying the stirrup ends of the lead-in wires 19, 20 of each of the photoflash lamps 15 is a curved wire support 21 extending radially outwardly to the middle of the respective side of the multilamp unit 14 from a central boss 22.

The base 16 further includes a depending center post 23 of cylindrical shape and four equally spaced retaining lugs 24 extending radially outwardly from the post 23 at its lower end.

To provide for flash operation with a camera, the multilamp unit 14 is inserted into a camera receiving socket 25 having an opening with a central bore and extended slots designed to receive the center post 23 and lugs 24. Because each of the lugs 24 extend radially outward in a direction corresponding to the axis of light emission of one of the lamps 15, the camera socket 25 is similarly positioned so that upon insertion of the multilamp unit into the socket 25 in any one of four positions as determined by the position of extended slots, one of the photoflash lamps 15 will be facing forward, i.e. in the direction of the objective axis 11. Correspondingly, exposed contact terminals 27, 28 of a suitable photoflash circuit in the housing 10 are positioned in front of the receiving socket 25 such that electrical contact is made between the terminals 27, 28 and the respective lead-in wires 19, 20 of the forward facing photoflash lamp 15. The photoflash circuit, designed to ignite the in-circuit lamp in timed relationship with camera shutter operation, may of course be any suitable construction.

Referring to FIG. 3, a suitable camera socket may include spring means, generally shown by 26, acting on opposing retaining lugs 24 by virtue of a bias in the direction of the arrows. To provide for a flexible connection, each retaining lug 24 is shaped to include upper and lower ramped surfaces 29, 30. The lower ramped surfaces 30 of the opposing front and back lugs 24 tend to urge the spring means 26 outwardly against the bias as the package 14 is inserted. When the package 14 is inserted sufficiently, the spring means 26 return by virtue of the bias over the upper ramped surfaces 27 of the opposing lugs 24. By reason of the acting force on the upper ramped surfaces 29 of the opposing lugs 24, the package 14 is urged downwardly to achieve a firm contact between terminals 27, 28 and the lead-in wires 19, 20 of the forward facing photoflash lamp 15.

In operation, the base post 23 of a disposable multilamp photoflash unit 14 is inserted into the socket 25, with one of the unused photoflash lamps 15 facing forward, until the spring means 26 overrides the lugs 24 to retain the package 14 in the socket 25. The camera is otherwise made ready for operation, and a photographic picture with augmenting flash is then taken by depressing the body release 13 to operate the shutter and ignite the forward facing photoflash lamp 15 in timed relationship therewith by the photoflash circuit. After the flash picture is taken, the multilamp unit 14 is rotated in a clockwise direction about its axis of rotation represented by center post 23, until the next succeeding photoflash lamp 15 is facing forward with its corresponding lead-in wires 19, 20 engaging the terminals 27, 28.

Upon completion of the taking of four successive flash pictures in the manner described, the used multilamp unit 14 can be removed by pulling the unit 14 upwardly out of the socket 25. During the upward movement, the upper ramped surfaces 29 push the spring means 26 apart to release the lugs 24 and permit the unit 14 to be removed. Of course, the unit 14 can be removed after the taking of any number of one or more flash pictures in order to take daylight pictures, and the unit reinserted with one of the remaining unused photoflash lamps 15 facing forward.

While this invention has been described with reference to a preferred embodiment, it is obvious that minor variations and changes can be resorted to without departing from the spirit of the invention or the scope of the subjoined claim.

I claim:
A unitary disposable multiflash lamp unit comprising:
a horizontal base support;
a center connecting post depending from below the base support about a central axis of rotation thereof;
a plurality of photoflash lamps permanently mounted in a vertical position on the base support about the axis of rotation, each photoflash lamp including lead-in wires extending through the base support for selective engagement from below the base support with electric terminals of the flash circuit of a photoflash device;
reflector means on the base support to direct light from each of the lamps along a selected line of emission;
a protective light transmitting cover overlying the lamps and reflector means; and
a plurality of radially extending lugs attached to the connecting post adjacent the lower end thereof to retain the base support in a photoflash device in a selected one of a predetermined number of positions of rotation with the lead-in wires of a selected one of the photoflash lamps engaging the terminals to fire the selected photoflash lamp, each of said lugs including upper and lower ramped surfaces for releasable engagement with spring means in the photoflash device.

References Cited

UNITED STATES PATENTS

| | | | |
|---|---|---|---|
| 3,087,318 | 4/1963 | Oswold | 240—1.3 X |
| 3,096,025 | 7/1963 | Prochnow | 240—1.3 |
| 3,244,087 | 4/1966 | Anderson | 95—11 |

JOHN M. HORAN, *Primary Examiner.*